UNITED STATES PATENT OFFICE.

CHRISTIAN RUDOLPH, OF OFFENBACH, GERMANY, ASSIGNOR TO THE FIRM OF K. OEHLER, OF SAME PLACE.

BLUE-BLACK AZO DYE.

SPECIFICATION forming part of Letters Patent No. 462,415, dated November 3, 1891.

Application filed May 27, 1891. Serial No. 394,289. (Specimens.)

*To all whom it may concern:*

Be it known that I, CHRISTIAN RUDOLPH, a subject of the Emperor of Germany, resident at Offenbach, near Frankfort-on-the-Main, Germany, have invented new and useful Improvements in Blue-Black Azo Dye-Stuffs, of which the following is a specification.

My invention consists of certain useful improvements in the manufacture of dye-stuffs or coloring-matters, of which the following is a full and clear description.

The way of proceeding to produce the new dye-stuffs consists in combining tetrazo diphenyl or ditolyl chloride with one molecule of amido-oxy-alpha-naphthaline disulpho-acid and with one molecule of alpha or beta naphthylamine. For example, eleven parts of tolidine or the corresponding quantity of benzidine are dissolved in seventy-five parts of muriatic acid of 12.5 per cent. and five hundred parts of water. After cooling the solution to zero, seven parts of sodium nitrite are added and the whole poured into a solution of eighteen parts of amido-oxy-alpha-naphthaline disulpho-acid in seven hundred parts of soda-lye of two per cent. In this manner so-called "intermediate" compounds are formed, which can be transformed into the new dye-stuff by further heating with a solution of 7.5 parts of alpha or beta naphthylamine in two hundred and fifty parts of water and twenty parts of muriatic acid of ten per cent.

The dye-stuffs formed are precipitated by common salt, pressed, and dried. The soda salts of the tolidine and benzidine azo-amido-oxy-alpha-naphthaline disulpho-acid-azo-naphthylamine is a bronze-colored powder soluble in water with a red-violet color. Concentrated muriatic acid added to the watery solution produces a blue-violet precipitate. Diluted soda-lye changes the color of the solution into dirty violet. The dye-stuffs dissolve in concentrated sulphuric acid with a blue color. The soda salts of the tolidine or benzidine azo-amido-oxy-alpha-naphthaline disulpho-acid-azo-beta-naphthylamine form a blackish-brown powder with a faint metallic luster. They dissolve in water with red-violet color. Diluted muriatic acid produces a red-violet precipitate. Soda-lye does not change the color of the solution. The dye-stuffs dissolve in concentrated sulphuric acid with a blue color.

What I claim, and desire to secure by Letters Patent, is—

As a new article of manufacture, the blue-black tetrazo dye-stuff herein described, derived from tetrazo diphenyl or ditolyl amido-oxy-alpha-naphthaline disulpho-acid and alpha or beta naphthylamine, which is soluble in water with a red-violet color and which dissolves in concentrated sulphuric acid with a blue color.

In testimony whereof I have signed my name to this specification in the presence of two subscribing witnesses.

CHRISTIAN RUDOLPH.

Witnesses:
 ALVESTO P. HOGUE,
 JEAN GRUND.